United States Patent
Dartu et al.

(10) Patent No.: US 8,042,010 B2
(45) Date of Patent: Oct. 18, 2011

(54) TWO-PHASE CLOCK-STALLING TECHNIQUE FOR ERROR DETECTION AND ERROR CORRECTION

(75) Inventors: Florentin Dartu, Beaverton, OR (US); Narendra V. Shenoy, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 356 days.

(21) Appl. No.: 12/256,338

(22) Filed: Oct. 22, 2008

(65) Prior Publication Data

US 2010/0097107 A1 Apr. 22, 2010

(51) Int. Cl.
*G06F 11/00* (2006.01)

(52) U.S. Cl. .......... 714/55; 714/2; 714/48; 714/49; 714/731; 714/744; 713/400; 713/401; 713/600; 713/601

(58) Field of Classification Search .......... 714/55, 714/724, 744, 731, 10, 2, 48, 49, 34, 15; 713/400, 401, 600, 601
See application file for complete search history.

(56) References Cited

U.S. PATENT DOCUMENTS

| | | | | |
|---|---|---|---|---|
| 4,462,072 A | * | 7/1984 | Tague et al. | 714/48 |
| 4,616,335 A | * | 10/1986 | Howe et al. | 713/601 |
| 4,679,195 A | * | 7/1987 | Dewey | 714/34 |
| 4,916,697 A | * | 4/1990 | Roche et al. | 714/10 |
| 5,230,046 A | * | 7/1993 | Iwata et al. | 714/2 |
| 5,918,043 A | * | 6/1999 | Kardach et al. | 713/601 |
| 6,889,311 B2 | * | 5/2005 | Flores et al. | 712/204 |
| 6,996,735 B2 | * | 2/2006 | Flores et al. | 713/401 |
| 7,065,665 B2 | * | 6/2006 | Jacobson et al. | 713/400 |
| 7,475,227 B2 | * | 1/2009 | Jacobson et al. | 712/219 |
| 2006/0005091 A1 | | 1/2006 | Mitra | |
| 2007/0016817 A1 | | 1/2007 | Albonesi | |
| 2008/0115004 A1 | | 5/2008 | Braun | |
| 2008/0250271 A1 | | 10/2008 | Ozer | |

OTHER PUBLICATIONS

Ernst et al. Razor: A Low-Power Pipeline Based on Circuit-Level Timing Speculation. Proceedings of the 36th International Symposium on Microarchitecture. IEEE. 2003.*
Subramanian et al. Conjoined Pipeline: Enhancing Hardware Reliability and Performance through Organized Pipeline Redundancy. IEEE. 2008.*
Kumar et al. Method to Minimize the Clock Skew and Uniform Clock Distribution using Parallel Port in Pipe Line Based Multi Channel DMA Request Terminal for Frequency Measurement. IJCSIT. vol. 1. pp. 126-129. 2010.*

* cited by examiner

*Primary Examiner* — Matthew Spittle
(74) *Attorney, Agent, or Firm* — Park, Vaughan, Fleming & Dowler LLP (57) ABSTRACT

One embodiment of the present invention provides a system that augments a circuit design with a mechanism for detecting and correcting timing errors. This system first partitions the circuit into a set of blocks that are clocked by an independent clock source, and integrates an error signal propagation circuit between the set of blocks. For a respective block, the system determines a set of internal registers that are to be implemented as double data sampling registers, and replaces the determined set of internal registers with double data sampling registers, wherein a given double data sampling register is configured to generate an error signal when it detects a timing error. Then, the system integrates a two-phase error correction circuit into the respective block, wherein when notified of a timing error by a double data sampling register, the two-phase error correction circuit is configured to stall registers in the respective block.

20 Claims, 1 Drawing Sheet

TWO-PHASE CLOCK-STALLING TECHNIQUE FOR ERROR DETECTION AND ERROR CORRECTION

BACKGROUND

1. Field of the Invention

The present invention generally relates to techniques and systems for detecting and correcting errors in a circuit. More specifically, the present invention relates to techniques and systems for augmenting a circuit design to detect and correct timing errors.

2. Related Art

Advances in semiconductor fabrication technology have given rise to dramatic increases in the number of transistors per semiconductor device by fabricating smaller transistors and compacting these transistors closer together. However, these new design practices can make a fabricated integrated circuit (IC) more vulnerable to physical faults or parasitic effects that can influence the performance of the IC. In response to these potential dangers, ICs are often designed with redundancy, error detection, and error correction whenever possible to make these circuits more robust. However, the performance and layout overhead associated with such error detection and correction circuits can make them prohibitive in a new circuit design.

Timing delay errors for a manufactured IC, in particular, are difficult to estimate and prevent during the initial design cycle for an IC. These errors occur when the computation for a given input vector cannot be completed before registers are sampled to capture a produced result. In some occasions, a timing delay error can occur in a manufactured IC as a result of a random manufacturing error, at which point the faulty IC can be discarded. However, when a timing delay error is encountered across a batch of manufactured ICs, the clock frequency for the ICs can be lowered to allow the ICs to operate correctly, but at the cost of sacrificing the performance level that the ICs were designed to operate under.

On the other hand, a manufactured IC may be capable of functioning at a higher frequency than was predicted for its circuit design. When a given circuit is designed and implemented, the circuit is generally designed to operate within a conservative set of values for process and environmental variables (i.e., a design corner). Moreover, the timing predictions for the circuit generated by analysis algorithms and models are usually padded to account for their inability to model some physical, electrical, and/or logic effects. These predictions produce a design margin, which is the difference in timing between the manufactured circuit and the analysis result, and it is a measure of how conservative the performance predictions are for a design process. When the assumed worst case scenarios fail to materialize in silicon due to a large design margin, the outcome of the large design margin is an overdesigned circuit, which is undesirable. It is common practice for a fabricated IC to be tested under a wide range of power and clock frequency parameters to determine the actual functioning parameters of the IC. A breaking point of the IC is usually found once the IC experiences timing errors.

A number of solutions have been developed for detecting and correcting timing errors, and a number of these solutions are based on double data sampling registers (DDSRs). A DDSR is a modified flip flop (FF) that is capable of detecting delay errors by using an extra "shadow" latch that samples the data later than a standard register, and then comparing the two sampled data for differences. If the "shadow" latch of the DDSR samples a value that is different than the regular latch of the DDSR, then the DDSR determines that it has detected an error. Once an error has been detected by a DDSR, an error signal is propagated to logic in the design that can correct the error.

However, existing systems that utilize DDSRs to implement an error detection circuit often require the presence of a specialized pipeline organization of the circuit, and perform error correction by flushing the pipeline and replaying the instructions/data. Two common DDSR solutions for performing error detection and error correction include:

Correcting an error in situ by either stalling the clock to allow time for replacing the incorrect value with the correct value from the "shadow" latch, or by stalling the data in a modified pipeline design.

Flushing a circuit pipeline after detecting an error in the pipeline, and allowing the circuit pipeline to recompute the results.

These implementations can impose a large physical overhead on a given circuit design, and can introduce a significant performance loss when flushing the pipeline to perform error correction. The first solution can impose strict limitations on what class of circuits can be augmented with the error detection and correction capabilities, as it requires simple pipelines. Furthermore, it also imposes a large circuit overhead due to its error correction mechanism and the modified circuit pipelines. The first solution is typically used for custom circuit designs, where error detection and error correction is applied to specific portions of the design. The second solution is not widely used to augment general ASIC designs with error detection and correction capabilities because it can impose a large performance overhead whenever an error is detected.

SUMMARY

One embodiment of the present invention provides methods and apparatuses to augment a circuit design with a mechanism for detecting and correcting timing errors. This system first partitions the circuit into a set of blocks that are clocked by an independent clock source, and integrates an error signal propagation circuit between the set of blocks. For a respective block, the system determines a set of internal registers that are to be implemented as double data sampling registers, and replaces the determined set of internal registers with double data sampling registers, wherein a given double data sampling register is configured to generate an error signal when it detects a timing error. Then, the system integrates a two-phase error correction circuit into the respective block, wherein when notified of a timing error by a double data sampling register, the two-phase error correction circuit is configured to stall registers in the respective block. The system also integrates a timing circuit into the respective block that generates the local clock signal from a global clock signal and the error signals.

In a variation on this embodiment, the system integrates the two-phase error correction circuit into the respective block by configuring internal registers of the respective block to stall during a first or a second stall phase of the two-phase error correction circuit. Furthermore, the system configures an input buffer to sample and hold signal values of an input signal source for the respective block during the first stall phase. The system configures an input multiplexer to select output signals of the input buffer during the second stall phase, and to otherwise select the input signal source for the respective block, such that output signals of the input multiplexer are coupled to primary input signals of the respective block. The system also configures a first output register to stall during the second stall phase of the two-phase error correction circuit, where output signals of the first output register are coupled to primary output signals of the respective block. Similarly, the system configures a second output register to stall during the first or second stall phase of the two-phase error correction circuit, where output signals of the second output register are coupled to input signals of the first output register.

In a further variation, the two-phase error correction circuit activates the first stall phase for a clock cycle following a notification of a timing error by a double data sampling register.

In a further variation, the two-phase error correction circuit activates the second stall phase for a clock cycle following the first stall phase.

In a variation on this embodiment, the system determines a set of registers that are to be implemented as double data sampling registers by first selecting an error-detection coverage which specifies a percentage of registers in a respective block that are to be implemented as double data sampling registers. Then, the system determines critical paths in the respective block that are difficult to design at a required frequency, and selects a number of registers from the determined critical paths so that the percentage of registers that are selected falls within the selected error-detection coverage.

In a variation on this embodiment, the system integrates an error signal propagation circuit between the set of blocks by generating a block level error signal for a respective block by combining the error signals generated by the double-data sampling registers of the respective block using a first logic circuit, wherein the first logic circuit propagates an error value onto the block level error signal when the signal value for at least one of the error signals generated by the double-data sampling registers is an error value. Furthermore, the error signal propagation circuit generates a global error signal by combining the block level error signals from the set of blocks using a second logic circuit, wherein the second logic circuit propagates an error value onto the global error signal when the signal value for at least one of the block level error signals is an error value.

In a further variation, the timing circuit of a respective block generates the local clock signal based on signal values for the block level error signal, the global error signal, and the global clock signal. To do so, the timing circuit propagates the global clock signal onto the local clock signal when the signal values for the block level error signal and the global error signal are not error values. Furthermore, the timing circuit blocks a clock signal transition of the global clock signal from propagating onto the local clock signal when the signal value for at least one of the block level error signal or the global error signal is an error value.

BRIEF DESCRIPTION OF THE FIGURES

FIG. 3 illustrates a global error propagation circuit of an augmented circuit in accordance with an embodiment of the present invention.

FIG. 4A illustrates a local error propagation circuit in accordance with an embodiment of the present invention.

FIG. 4B illustrates a global error propagation circuit in accordance with an embodiment of the present invention.

FIG. 4C illustrates a timing circuit in accordance with an embodiment of the present invention.

FIG. 4D illustrates a local error propagation circuit in accordance with an embodiment of the present invention.

FIG. 4E illustrates a global error propagation circuit in accordance with an embodiment of the present invention.

FIG. 4F illustrates a timing circuit in accordance with an embodiment of the present invention.

FIG. 5A illustrates a four-level Boolean AND operation in accordance with an embodiment of the present invention.

FIG. 5B illustrates a transistor circuit implementation for a four-level Boolean AND operation in accordance with an embodiment of the present invention.

FIG. 6 illustrates a number of propagation paths for an augmented circuit in accordance with an embodiment of the present invention.

FIG. 7 presents a flow chart illustrating a process for augmenting a circuit to detect and correct timing errors in accordance with an embodiment of the present invention.

FIG. 8 presents a flow chart illustrating a process for configuring a block of an augmented circuit to detect and correct timing errors in accordance with an embodiment of the present invention.

FIG. 9 presents a flow chart illustrating a process for detecting and correcting timing errors in accordance with an embodiment of the present invention.

FIG. 10 illustrates an exemplary computer system that facilitates augmenting a circuit to detect and correct timing errors in accordance with an embodiment of the present invention.

TABLE 1 illustrates an exemplary error correction procedure in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention provide a method and system for augmenting a circuit design with a logic architecture for performing error detection and error correction operations. These methods are amenable to electronic design automation (EDA) tools and flows, and can be implemented by a computer system comprising a processor, a memory, and a storage device for storing instructions that, when executed by the computer system, cause the computer system to perform the methods for augmenting a circuit design with logic that performs error detection and error correction operations on the circuit design. The methods and systems for augmenting a circuit design with error detection and error correction capabilities are hereinafter referred to as an augmentation system. Furthermore, a circuit that is modified by the augmentation system to perform error detection and correction capabilities is hereinafter referred to as an augmented circuit.

In some embodiments of the present invention, an augmented circuit is capable of correcting certain types of timing-induced errors, with a minimal impact on the behavior of the circuit. Furthermore, an augmentation system is intended to overcome a number of complications associated with augmenting a circuit design with error detection and correction capabilities. For instance, an error recovery operation can cause one portion of the circuit to become unsynchronized from the rest of the circuit (i.e., one clock cycle behind). Furthermore, the physical limitations on how fast electrical signals can propagate across a microchip complicate the task of augmenting a fast and large circuit design with error detection and error correction capabilities. This is because an error needs to be detected, and an error signal needs to be generated and propagated across the microchip to prevent the detected error from propagating, all before a subsequent clock transition. When error correction is applied on complete circuit designs, the propagation latency from a clock source to a DDSR can prevent the DDSR from generating an error signal in time to block the subsequent rising clock edge at the clock source.

In some embodiments of the present invention, an augmentation system incorporates clock stalling (gating) and in situ error correction circuits into a circuit design to manage the complications associated with augmenting a complete design with error detection and correction capabilities. These embodiments partition the circuit design into a number of independently clocked circuit blocks, where each circuit block implements a two-phase clock-stalling technique that allows the circuit to recover from any number or sequence of local delay errors, and performs an implicit resynchronization operation across the circuit blocks as a response to an error correction operation at any of the circuit blocks.

Figure 1:
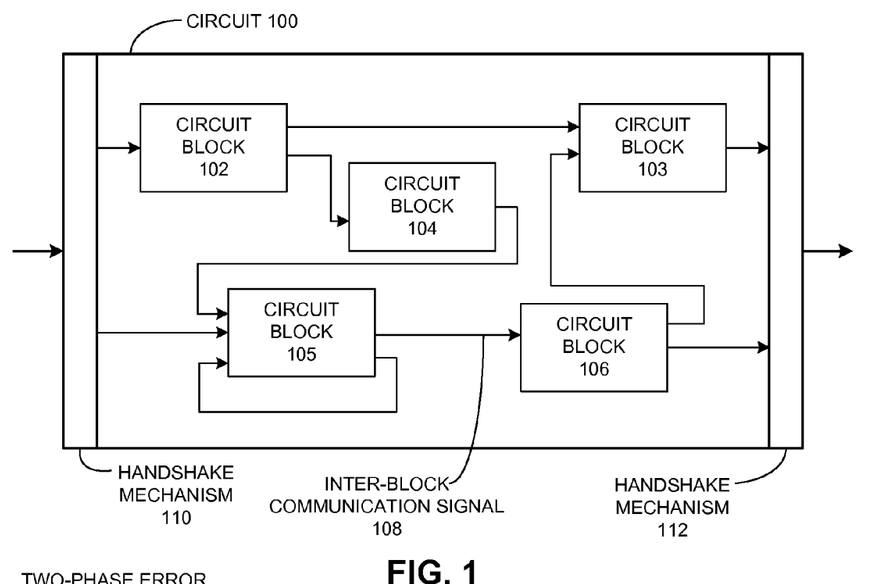
FIG. 1 illustrates a circuit augmented with an error detection and error correction system, comprising a number of circuit blocks and a number of communication signals coupled to the circuit blocks, in accordance with an embodiment of the present invention.

FIG. 1 illustrates an exemplary circuit 100 that is augmented with error detection and error correction capabilities in accordance with an embodiment of the present invention. Augmented circuit 100 is created by an augmentation system to augment a circuit design with error detecting and error correction capabilities, and the augmented circuit comprises a number of circuit blocks 102-106, and a number of inter-block communication signals (e.g., inter-block communication signal 108) coupled to circuit blocks 102-106.

In some embodiments of the present invention, the augmentation system provides augmented circuit 100 with a mechanism to resynchronize the circuit blocks after an error recovery operation, where clock delays propagate toward the circuit boundary. This circuit boundary comprises handshake mechanisms 110-112 that are capable of communicating clock delays with other circuit components of an electronic system. Therefore, when an error recovery operation from within an independently clocked circuit block causes a clock stall to propagate toward the circuit boundary of augmented circuit 100, handshaking mechanisms 110-112 of circuit 100 inform other circuit components whether the circuit boundary is accepting or providing new data.

The Augmented Circuit Architecture

In some embodiments of the present invention, augmenting a circuit design comprises incorporating the following components into the augmented circuit: DDSRs for performing error detection, circuitry for propagating error signals across circuit blocks, circuitry for recovering from a detected error and for synchronizing the independently clocked circuit blocks, and the handshaking mechanisms at the circuit boundaries of a circuit design. In some variations of these embodiments, an augmented circuit adopts the handshaking mechanism that already exists in the asynchronous IO of a circuit design. In other variations, the augmented circuit can extend a handshaking protocol that exists within the internal blocks of a circuit design onto the handshaking mechanism at the boundary of the circuit design.

In some embodiments, the augmentation system can be used to augment a wide variety of pipelined circuit designs, and is not restricted to flushable pipelines. Furthermore, the augmentation system can be used to augment larger circuit designs than other error detection/correction techniques are capable of managing. The performance provided by the augmentation system is due to how a circuit is partitioned into blocks, where each block has an independently gated clock source. When an augmented circuit detects an error within a circuit block, it triggers an error correction operation within the same circuit block, and utilizes a subsequent clock cycle to perform resynchronization between circuit blocks.

In some embodiments, augmenting a circuit design with error detection and correction capabilities impacts the area, power, performance and the design methodology for the circuit design. The level of impact depends on several high-level design decisions. The first decision requires selecting a DDSR coverage: the percentage of registers that are converted to DDSRs to perform error detection. A larger DDSR coverage for a circuit design results in a larger power/area overhead, which in turn can impede the advantages provided by augmenting the circuit design with error detection and correction capabilities. On the other hand, a smaller DDSR coverage requires advanced tools and methods for accurately determining the ideal register candidates that should be converted into DDSRs for performing error detection.

The second decision requires selecting a method for inserting DDSRs into a circuit design. There are two basic DDSR insertion styles: planning ahead by partitioning the circuit into blocks before optimizing the circuit design, or the Engineering Change Order (ECO) style for altering a circuit implementation late in the design process. The former is capable of using circuit optimization results to detect the worst-case paths in circuit blocks that can benefit most from error detection, and then augment the partitioned circuit design to insert DDSRs into these worst-case paths. In some embodiments of the present invention, an augmentation system performs a combined method, which performs some decisions early in the design process associated with augmenting a circuit design with error detection and correction capabilities (e.g., performing clock gating and/or circuit block partitioning before circuit optimization procedures), and performs some implementation operations late in the design process (i.e., performing DDSR insertion and/or circuit augmentation operations after circuit synthesis).

The third decision requires determining the purpose for augmenting a circuit design with error detection and correction capabilities. In some embodiments of the present invention, a circuit can be augmented to implement dynamic power supply variation that can be easily shifted to dynamic frequency and/or body bias. This may cause an augmented circuit to encounter timing errors across a large number of circuit paths, and therefore require the augmented circuit to implement a large DDSR coverage. In other embodiments of the present invention, a circuit can be augmented to guarantee proper functionality across a number of circuit paths that are difficult to design at a required frequency.

In some embodiments of the present invention, a circuit designer can optimize a circuit design for typical design margins, and rely on the error detection and correction capabilities that are incorporated into the circuit design by the augmentation system to handle circuit paths that can experience timing errors in the worst-case runtime scenarios. This approach requires few DDSRs for most applications, and therefore has a small impact on the circuit power and area. This approach can be used either to reduce the time to market of a first-generation circuit design, or to moderately increase the performance of the circuit design.

Circuit Block Pipelines

A circuit design is often implemented using a pipelined architecture when the function of a logic block cannot be performed within a clock period. It is commonly known that a circuit pipeline consists of a number of sequential elements that are coupled into a sequence by clocked registers, where the sequential elements can execute in parallel or in series. A pipeline distance between a signal and a sequential element is the minimum number of sequential elements that need to be traversed on any possible path between the signal and the aforementioned sequential element. This definition for a distance through a pipeline can be used to determine the distance between an input pin of a circuit block and a given register, or between a given register and an output pin of a block. Hereinafter, the notation $FF^{i,j}$ refers to a register with a minimum distance i to any of the input pins of the circuit block, and a minimum distance j to any of the output pins of the circuit block. Similarly, the notation $FF^{i,-}$ refers to the set of registers that have a minimum distance i to the input pins, irrespective of their distance to the output pins. Furthermore, the notation $FF^{-,j}$ refers to the set of registers that have a minimum distance j to the output pins, irrespective of their distance to the input pins.

Figure 2:
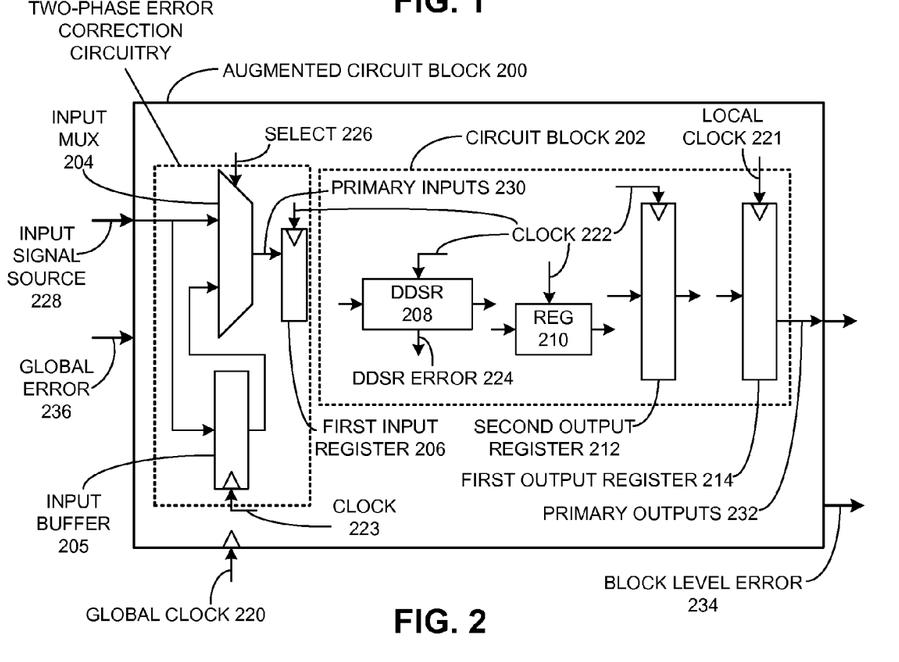
FIG. 2 illustrates an augmented circuit block in accordance with an embodiment of the present invention.

FIG. 2 illustrates an augmented circuit block 200 in accordance with an embodiment of the present invention. Circuit block 200 implements an independently clocked block of an augmented circuit, and comprises a circuit block 202, an input multiplexer 204, an input buffer 205, a first input register 206, a number of DDSRs (e.g., DDSR 208) and registers (e.g., register 210) in circuit block 202, a first output register 214, and a second output register 212. Registers 206-214 of circuit block 200 form a pipeline with a minimum of three stages. In this pipeline, first input register 206 is a member of $FF^{0,-}$, and can be implemented either as a regular register or a DDSR. Furthermore, first output register 214 is a member of $FF^{-,0}$, second output register 212 is a member of $FF^{-,1}$, and output registers 212-214 are not implemented as DDSRs. In some embodiments, registers 212-214 can be registers from the initial register pipeline of circuit block 202. In some other embodiments, registers 212-214 can be registers which are augmented onto circuit block 202 when the initial circuit design for circuit block 202 does not implement a register pipeline with a minimum of three stages.

Circuit block 200 accepts a global clock signal 220 and a global error signal 236, and generates a number of clock signals to control the timing of registers 206-214 while performing error correction. First output register 214 is triggered by local clock 221, second output register 212 and registers 206-210 are triggered by clock 222, and input buffer 205 is occasionally triggered by clock 223. Furthermore, circuit block 200 generates a block level error signal during an error correction operation that other blocks of an augmented circuit can use to synchronize themselves with circuit block 200. The following paragraphs describe the techniques used by the augmentation system to create circuit components for generating clock signals 221-223, for controlling a select signal 226 for input multiplexer 204, and for generating block level error signal 234.

Two-Phase Clock-Stalling Technique

In some embodiments of the present invention, an augmentation system incorporates a two-phase clock-stalling technique into an augmented circuit, where the augmented circuit implements a number of circuit blocks 200 that can be clock gated independently. In some embodiments, the two clock-stalling phases dictate how circuit blocks 200 respond to a detected error as follows:

Phase I: All circuit blocks 200 that detect an error get an immediate stall for the clock cycle following the error detection.

Phase II: The remaining circuit blocks 200 which do not detect an error get a clock stall for the clock cycle that follows the immediate stall.

The first clock-stalling phase ensures that an error is not propagated before error correction is performed (error correction begins in the same clock cycle that the error is detected). The corrected value can take up to one additional clock cycle to propagate, which requires a clock stall at certain registers to ensure the error value is not latched. The second phase is required to re-synchronize the individually clocked blocks after a circuit block performs an error correction operation.

Hereinafter, the clock cycles associated with the error detection and error correction operations are labeled as follows: E1 denotes the clock cycle when a first error is detected by a circuit block 200, and E2-E4 denote the clock cycles used by the augmented circuit to perform error correction. Similarly, an augmented circuit that does not detect an error (and does not perform error correction operations) has the corresponding clock cycles labeled in the following corresponding order: NE1, NE2, NE3, and NE4. For example, NE1 for a first augmented circuit would be the equivalent of E1 for a second augmented circuit if no error is found on the second augmented circuit.

Furthermore, a clock cycle is hereinafter said to begin with the sampling transition of the clock, and end right before the subsequent sampling transition. Signals latched by registers during a given clock cycle are propagated to the inputs of some other registers during the same clock cycle, and those inputs are latched during the subsequent clock cycle. Inserting DDSRs into a circuit block 200 in place of standard registers introduces an overhead in terms of power, area and performance. In some applications, it is possible that the benefits of inserting error detection and error correction logic for a specific register may not be large enough to justify the overhead. Therefore, embodiments of the present invention do not advocate replacing registers with DDSRs throughout a given circuit design. Instead, DDSRs are targeted for the critical portions of a circuit block 200. In some applications of the augmentation system, a number of blocks may exist that do not require any DDSRs. However, even when a circuit block 200 does not require DDSRs for error detection, it is implemented with the two-phase clock-stalling technique so it can be resynchronized with other circuit blocks of the augmented circuit.

Augmented Circuit Behavior

In some embodiments of the present invention, the methods for augmenting a circuit design can impose several conditions onto how a circuit block 200 of an augmented circuit is implemented and augmented with DDSRs. The conditions can include:

C1—Clock signal 222 driving a circuit block 200 is separate from the clock signals driving other blocks in the augmented circuit, and can be blocked for one clock cycle (although, circuit block 200 can still receive and buffer an incoming input vector using clock signal 223 on input buffer 205).

C2—DDSRs replace registers that do not belong to $FF^{-,0}$ or $FF^{-,1}$.

C3—The input vectors to $FF^{0,-}$ are buffered into an input buffer 205, and an input multiplexer 204 selects between the current input signal source 228 and input buffer 205. In one variation to these embodiments, input buffer 205 can be clocked by global clock 220. In another variation, input buffer 205 is clocked by clock signal 223, which reduces power consumption by generating a clock pulse only for the clock cycle that follows error detection.

C4—In phase I stalls (during E2), for the applicable circuit blocks, the entire circuit block 200 is stalled except $FF^{-,0}$ and the input buffer (i.e., clock signal 222 is stalled, but clock signals 221 and 223 are not stalled).

C5—In phase II stalls (during E3), for the applicable blocks, the entire circuit block 200 is stalled. In some variations to this embodiment, this is achieved by stalling global clock signal 220. In other variations, this is achieved by stalling clock signals 221-223 of circuit block 200.

C6—The error signals from the DDSRs (e.g., DDSR error 224) of a circuit block 200 are combined to form a block level error signal 234, and the block level error signals from the set of circuit blocks of an augmented circuit are combined to form a global error signal 236. In some embodiments of the present invention, global error signal 236 is propagated back to the source for global clock signal 220 to stall every independently clocked block during Phase II stalls.

C7—Input multiplexer 204 selects the output of input buffer 205, during the clock cycle that follows a stall operation, in the circuit blocks that experience a Phase I stall operation. Otherwise, input multiplexer 204 selects the input signal source 228 for all other circuit blocks.

In some embodiments, the behavior of a circuit block 200 can be influenced by several properties associated with the error detection and correction capabilities that are implemented by the augmentation system. These properties include:

P1—An error is not latched by a register when the register is stalled.

P2—An error does not exist if it is not detectable (e.g., registers where a DDSR is not employed).

P3—A timing error is not detected during the clock cycle that immediately follows a stall operation (e.g., a stall allows a signal 2T to settle when it requires 1.5×T, T being the clock period).

The three block properties P1-P3 indicate that an augmented circuit block 200 does not experience an error in more than one clock cycle during E1 through E3, and that a circuit block 200 does not experience an error during E3. The following paragraphs establish that an augmented circuit correctly recovers from a detected error by demonstrating that the stable state of the system at the end of E3 is identical to the stable state at the end of NE2. In essence, the system completely recovers from an error within three clock cycles after detecting the error, and loses only one clock cycle to the recovery process. This demonstration illustrates how the signals of a block behave for the clock cycles following the detection of an error, and then contrasts these signal values with the signal values of the corresponding error-free case.

TABLE 1 illustrates an exemplary error correction procedure when two circuit blocks detect an error in subsequent global clock periods. This example is associated with an augmented circuit that includes an input handshaking mechanism H1, three circuit blocks (i.e., B1-B3), and an output handshaking mechanism H2. In this example, circuit block B2 detects a timing error during clock period $T_1$, and initiates an error correction procedure.

Phase I of the error correction procedure takes place during clock period T2, where circuit block B2 is stalled to perform a local error correction operation. This stall operation provides circuit block B2 with the extra time it needs to recover from the timing error. Phase II of the error correction procedure takes place during clock period T3, where circuit blocks B1 and B3, and handshaking mechanisms H1-H2, are stalled to synchronize them with circuit block B2. As a result of the error correction procedure, the registers of circuit block B2 latch the correct values by the end of global clock period T2, and circuit block B2 is once again synchronized with the rest of the augmented circuit by the end of global clock period T3.

Also in this example, circuit block B3 experiences a timing error during clock period T2. However, because circuit block B3 is stalled during clock period T3, it is being provided with sufficient time to recover from the timing error. This stall operation prevents circuit block B3 from detecting the timing error (i.e., property P3), and prevents it from initiating a new error correction procedure.

TABLE 1

| | Clock period | | | | | | | |
|---|---|---|---|---|---|---|---|---|
| | $T_1$ | | $T_2$ (Phase I) | | $T_3$ (Phase II) | | $T_4$ | |
| Global clock | 0 | 1 | 0 | 1 | 0 | 1 | 0 | 1 | 0 |
| H1 ($T_{III}$) | | NE1 | | NE2 | | NE2 | | NE3 | |
| B1 ($T_{III}$) | | NE1 | | NE2 | | NE2 | | NE3 | |
| B2 ($T_I$) | | E1 | | NE1 | | NE2 | | NE3 | |
| B3 ($T_{II}$) | | NE1 | | E2 | | NE2 | | NE3 | |
| H2 ($T_{III}$) | | NE1 | | NE2 | | NE2 | | NE3 | |

In some embodiments, these are the only types of blocks that can be encountered in an augmented circuit consistent with the block properties P1-P3:

Type I—circuit blocks which detect errors during E1 (e.g., circuit block B2 of Table 1).

Type II—circuit blocks which detect errors during E2 (e.g., circuit block B3 of Table 1).

Type III—circuit blocks which do not detect any errors during E1, E2 or E3 (e.g., circuit block B1 of Table 1).

Circuit blocks operate during E1 as follows:
Type I circuit blocks:
  Blocks are latching the same values that correspond to NE1 values, and latch some errors.
  Blocks do not experience an error at the last two levels of registers.
Type II and III circuit blocks:
  All signal values correspond to NE1 values, as all operations are correct at this point, and all registers are clocked normally.
Circuit blocks operate during E2 as follows:
Type I circuit blocks:
  All registers are stalled, except register $FF^{-,0}$.
  All errors are corrected locally, so all stalled registers preserve the correct values that correspond to NE1.
  No errors are propagated (i.e., no errors are latched by a target register) because no DDSR feeds a clocked register, and no DDSR feeds an output directly (i.e., DDSRs feed $FF^{-,1}$ and $FF^{-,0}$, which can be stalled).
  $FF^{-,0}$ latches correct values that correspond to NE2 values, which were propagated by $FF^{-,1}$ registers at the previous clock tick.
  The block input values correspond to NE2 values. However, $FF^{0,-}$ is not accepting input vectors (i.e., $FF^{0,-}$ stalled).
  The input values are latched by an input buffer (i.e., the input buffer holds the input signals that correspond to NE2).
Type II circuit blocks:
  Independently clocked blocks are latching the same values that correspond to NE2, with some errors.
  Independently clocked blocks do not experience an error at the output of the block (i.e., output signal values correspond to NE2).
Type III circuit blocks:
  All signal values correspond to NE2 signal values, as all operations are correct at this point, and all registers are clocked normally.
Circuit blocks operate during E3 as follows:
Type I circuit blocks:
  All registers are clocked.
  $FF^{-,0}$ latches values that correspond to NE2 values because its inputs did not change (i.e., $FF^{-,1}$ continues to latch values from the previous clock cycle).
  The block input values change to values that correspond to NE3 values (i.e., the outputs of all blocks launched NE2 signal values during the previous clock tick).
  All registers that have been stalled during E1, which latch values that correspond to NE1 values, now latch values that correspond to NE2 values because of the stall.
  As a special case, $FF^{0,-}$ latches values that correspond to NE2 values by latching the output of the input buffer.
Type II circuit blocks:
  All registers (including $FF^{-,0}$) are stalled, which causes the latched values to correspond to the correct NE2 values.
  The block input values correspond to NE3 values, but they are not processed.
Type III circuit blocks:
  All registers are stalled, which causes the latched values to correspond to the correct NE2 values.
  The block output values do not change.0
  The input values change to NE3 signal values, but they are not processed.
The presented behavior for the clock-stalling operations across the clock cycles E1-E3 illustrates that during E3, the circuit blocks of types I-III contain signal values that correspond to correct NE2 values. Furthermore, the augmented circuit correctly propagates these signal values to the inputs of any other circuit component of an electronic system, given that handshaking mechanisms guarantee that these other circuit components are expecting input values that correspond to correct NE2 values.

Error Signal Propagation

FIG. 3 illustrates a global error propagation circuit 308 of an augmented circuit 300 in accordance with an embodiment of the present invention. Augmented circuit 300 includes a number of circuit blocks (e.g., circuit block 302), which receive a global clock signal 304, and generate a number of block level error signals (e.g., block level error 306). These block level error signals propagate to global error propagation circuit 308, which uses these block level error signals to generate a global level error 310, and propagates global level error signal 310 to the circuit blocks.

In some situations, multiple independently clocked circuit blocks may experience an error simultaneously (i.e., within corresponding clock cycles across the multiple independently clocked blocks), or across a number of clock cycles. In either of these two cases, the augmented circuit propagates error signals from all circuit blocks that are experiencing an error to all other circuit blocks in time to stall the following sampling transition of the clock signal.

FIG. 4A illustrates a local error propagation circuit 400 in accordance with an embodiment of the present invention. Local error propagation circuit 400 exists within an independently clocked circuit block, and can generate a block level error signal 408 for the circuit block by combining a number of DDSR errors 404-406 with a Boolean AND logic gate 402. In this embodiment, DDSR error signals 404-406 are active-low input signals to local error propagation circuit 400, and block level error 408 is an active-low output signal. To accommodate a DDSR which generates an active-high error signal, the error signal from the DDSR can be coupled to an input of local error propagation circuit 400 by inverting the active-high error signal to produce an active-low error signal.

FIG. 4B illustrates a global error propagation circuit 420 in accordance with an embodiment of the present invention. Global error propagation circuit 420 exists within an augmented circuit, and can generate a global level error signal 428 for the independently clocked circuit blocks of the augmented circuit by combining a number of block level errors 424-426 with a Boolean AND logic gate 422. In this embodiment, block level error signals 424-426 are active-low input signals to global error propagation circuit 420, and global level error 428 is an active-low output signal.

FIG. 4C illustrates a timing circuit 440 in accordance with an embodiment of the present invention. The augmented circuit gates a global clock signal 444 within the independently clocked circuit blocks by producing a local clock signal 448 for a respective circuit block. Timing circuit 440 exists within an independently clocked circuit block, and generates a local clock signal 448 for the circuit block by combining global clock 444, a global error 445, and a block-level error 446 with a Boolean AND logic gate 442. In this embodiment, global error 445 and block level error 446 are active-low input signals to timing circuit 440, and cause local clock 448 to remain low when a DDSR detects an error. A DDSR which gates an input value at a rising clock edge generates an error signal after the falling clock edge, while the input clock remains low. Therefore, timing circuit 440 receives error signals 445-446 when global clock 444 is low, and prevents a rising clock edge on global clock 444 from propagating to local clock 448 while a DDSR is asserting an error signal. To accommodate a register which gates an input signal at a falling clock edge (e.g., a DDSR which generates an error signal after the rising clock edge), the clock input of the DDSR can be coupled to a clock signal that is generated by inverting local clock 448.

FIG. 4D illustrates a local error propagation circuit 450 in accordance with an embodiment of the present invention. Local error propagation circuit 450 exists within an independently clocked circuit block, and can generate a block level error signal 458 for the circuit block by combining a number of DDSR error signals 454-456 with a Boolean OR logic gate 452. In this embodiment, DDSR error signals 454-456 are active-high input signals to local error propagation circuit 450, and block level error 458 is an active-high output signal. To accommodate a DDSR which generates an active-low error signal, the error signal from the DDSR can be coupled to an input of local error propagation circuit 450 by inverting the active-low error signal to produce an active-high error signal.

FIG. 4E illustrates a global error propagation circuit 460 in accordance with an embodiment of the present invention. Global error propagation circuit 460 exists within an augmented circuit, and can generate a global level error signal 468 for the independently clocked circuit blocks of the augmented circuit by combining a number of block level errors 464-466 with a Boolean OR logic gate 462. In this embodiment, block level error signals 464-466 are active-high input signals to global error propagation circuit 460, and global level error 468 is an active-high output signal.

FIG. 4F illustrates a timing circuit 470 in accordance with an embodiment of the present invention. The augmented circuit gates a global clock signal 474 within the independently clocked circuit blocks by producing a local clock signal 478 for a respective circuit block. Timing circuit 470 exists within an independently clocked circuit block, and generates a local clock signal 478 for the circuit block by combining global clock 474, a global error 475, and a block-level error 476 with a Boolean OR logic gate 472. In this embodiment, global error 475 and block level error 476 are active-high input signals to timing circuit 470, and cause local clock 478 to remain high when a DDSR detects an error. A DDSR which gates an input value at a falling clock edge generates an error signal after the rising clock edge, while the input clock remains high. Therefore, timing circuit 470 receives error signals 475-476 when global clock 474 is high, and prevents a falling clock edge on global clock 474 from propagating to local clock 478 while a DDSR is asserting an error signal. To accommodate a register which gates an input signal at a rising clock edge (e.g., a DDSR which generates an error signal after the falling clock edge), the clock input of the DDSR can be coupled to a clock signal that is generated by inverting local clock 478.

FIG. 5A illustrates a four-level Boolean AND operation 500 in accordance with an embodiment of the present invention. Boolean AND operation 500 is implemented by a multi-layered NAND-NOR configuration of Boolean logic gates (e.g., logic gates 502-504). In some variations on this embodiment, Boolean AND operation 500 can be implemented as a wide logic gate with few levels of logic. This implementation provides an optimal performance because the transistors of a logic gate have a constant output load with a typical fanout of one logic gate, and the critical paths for a one-to-zero input signal transition propagate through the parallel transistors of the NAND and NOR logic gates (e.g., networks 532-534 of FIG. 5B). In a four layer implementation of Boolean AND Operation 500, the first layer of logic gates accepts a number of input signals (e.g., input signals 506) that correspond to the inputs for Boolean AND operation 500, and the fourth layer is implemented as a single Boolean NOR logic gate that generates an output signal 508 that corresponds to the output for Boolean AND operation 500.

FIG. 5B illustrates a transistor circuit 520 that implements a four-level Boolean AND operation 500 in accordance with an embodiment of the present invention. A pull-up network 530 and pull-down network 532 together implement a Boolean NAND logic gate 502. Similarly, a pull-up network 534 and a pull-down network 536 together implement a Boolean NOR logic gate 504.

In some embodiments of the present invention, the CMOS (complementary metal-oxide semiconductor) implementation for Boolean AND operation 500 is optimized for propagating the enabling transition of an error signal. For an enabling transition that takes place when a signal transitions from a logic value 1 to a logic value 0, a time-critical path through transistor circuit 520 propagates through pull-up network 530 and pull-down network 536. In other words, the time-critical paths propagate through one of the parallel transistors in logic gates 502-504, thereby avoiding the transistor stacks that are generally slower. Therefore, the CMOS implementations for logic gates 502-504 can be optimized for the enabling input transition by biasing the CMOS circuits. To do so, the stack transistor networks (e.g., pull-down network 532 and pull-up network 534) can be configured to have a weaker pull than the parallel transistor networks (e.g., pull-up network 530 and pull-down network 536). This optimization is possible because the logic gates that implement the Boolean AND operation do not need balanced delays.

In some embodiments of the present invention, a four-level Boolean OR operation can be implemented based on similar techniques for implementing Boolean AND operation 500. For example, a two-level Boolean OR operation can be implemented by coupling the output signals of a first level of Boolean NOR logic gates to the input signals of a second-level Boolean NAND logic gate. Furthermore, the CMOS implementations for the Boolean NAND and Boolean NOR logic gates of the four-level Boolean OR operation can be constructed based on the techniques described for implementing Boolean NAND logic gate 502 and Boolean NOR logic gate 504. By doing so, the CMOS implementation for the Boolean OR operation is optimized for propagating an enabling transition of an active-high error signal, which takes place when an error signal transitions from a logic value 0 to a logic value 1.

Hereinafter, the delays through gates and interconnect are expressed in terms of a fan-out of four (FO4) delay. The FO4 delay is the delay of an inverter loaded by four inverters of the same size. In the case that logic gates are implemented with unbalanced pull-up and pull-down networks, the delay is the average of the delays for the zero-to-one and one-to-zero signal transitions.

Physical Constraints for Error Detection and Correction Circuits

FIG. 6 illustrates a number of propagation paths 602-604 for an augmented circuit 600 in accordance with an embodiment of the present invention. An error signal propagation path 604 reflects the path traversed by a DDSR error signal 622 as it propagates back to a DDSR 620. Error signal propagation path 604 traverses a block-level error signal 624 and a local clock signal 628, and a propagated value is also affected by a global clock signal 626 of augmented circuit 600. A logic propagation path 602 reflects the delay through logic 614-618 as signals propagate through a pipeline of registers 606-612.

These propagation paths impose two timing constraints onto an augmented circuit. The first constraint is applied to an augmented circuit block of a circuit design, and not to the entire chip. Under this configuration, a local error signal races to the local independently gated clock source to stop the following sampling transition. Hereinafter, the constraint scenario is referred to as an "intra-block" constraint. The second constraint involves generating a global error signal at an augmented circuit block, and propagating the global error signal back to the independently clocked blocks of an augmented circuit within one clock period. Also, the second constraint is hereinafter referred to as an "inter-block" constraint.

In the following paragraphs, propagation constraints are derived for the clock and error signals. These propagation constraints correspond to a number of circuit design assumptions, and the derived constraint values can vary for circuit designs with different assumptions. These propagation constraints can influence the possible dimensions for a circuit block, thereby affecting how a circuit design is partitioned into a number of independently clocked blocks when the circuit design is being augmented with the error detection and correction capabilities.

The intra-block constraint follows from the observation that, since the last two levels of registers of a locally clocked circuit block cannot be implemented using DDSRs, the block requires at least three pipeline stages to include a DDSR into the block pipeline. Therefore, the block must have sufficient complexity to support three levels of pipelining, with an ideal propagation delay greater than 3 T (T being the clock period).

Linking the timing constraints of a circuit to the physical dimension constraints of the circuit requires considering how signal propagation speed can vary through different classes of circuits. For example, the following assumptions allow computing the signal propagation speed through relatively dense logic:

1. the logic gates are aligned in a straight line,
2. a certain white space to cell ratio (e.g., 33%),
3. average gate delay to be the FO4 delay.

These assumptions lend themselves to computing the signal propagation speed through logic, expressed in CW units (usually microns), over FO4:

$$s_{logic} = 1.33 \times CW.$$

Similarly, some embodiments of the present invention can compute the speed of signal propagation through the clock distribution from actual clock tree information, while other embodiments can compute the speed of signal propagation based on some predetermined assumptions. For example, the signal propagation speed through a clock distribution can be approximated based on the speed through another class of circuits: transmission lines with inverter insertions for close to optimal delay.

The delay of an arbitrary pipeline stage is commonly known to exist between 16 and 40 FO4 delays, where a smaller delay provides a more aggressive circuit design (i.e., closer to custom design performance). To accommodate circuit designs with a pipeline stage with these delays, it follows that a delay for error signal propagation plus the clock distribution delay should be less than 8 to 20 FO4 delays. According to the previous section, the error signal propagation can be safely considered to be less than 4 FO4 delays. Therefore, the block should be small enough that the clock distribution can be propagated within 4 to 16 FO4 delays. In other words, considering a square block, implemented using Manhattan routing with the clock source in the center, the clock signal needs to cross the width of the block in less than 4 to 16 FO4 time. At the same time, signals that pass through the logic can experience a delay larger than 48 to 120 FO4 delays (i.e., at least three pipeline stages). The physical constraint can be written in terms of the distance crossed by the signals through the respective circuit class in the allowed time. In the exemplary circuit, the clock signal has approximately 4 to 16 FO4 time to cross a distance larger than the signal through logic can cross in 48 to 120 FO4 time, which implies:

$$Distance_{clock} > Distance_{logic}$$

The speed of the clock signal propagation is herein written using the notation "$s_{clock}$," and the approximated delay of 4 to 16 FO4 time for the clock signal is written using the notation "4 . . . 16(FO4)." Similarly, the speed of propagating a logic signal through logic is herein written using the notation "$s_{logic}$," and the approximated delay of 48 to 120 FO4 time for propagating the signal is written using the notation "48 . . . 120(FO4)." Using this notation, the relationship between the distance traveled between the clock signal and the distance traveled by a signal through logic implies:

$$s_{clock} \times 4 \ldots 16(FO4) > s_{logic} \times 48 \ldots 120(FO4).$$

Observing that high performance designs are more demanding, the constraint between the propagation speed for the clock signal and the propagation speed for logic signals takes the form:

$$\frac{s_{clock}}{s_{logic}} > 12.$$

Methodology Impact

In some embodiments of the present invention, the augmentation system provides an augmented circuit with an ability to perform error detection and error correction, which can be used for a number of applications:

1. A circuit can be designed to operate within a given power/performance margin, and be capable of functioning reliably under the worst-case design margin parameters. Therefore, an augmentation system enables a circuit to obtain a better power/performance trade-off than a circuit that is not augmented with error detection and correction capabilities. Furthermore, the fabrication yield of a circuit design is improved by the manufactured circuits that utilize the self-correcting property that the augmentation system incorporates into the circuit design.
2. The time-to-market of a circuit design can be improved by terminating the circuit optimization process earlier. Time can be saved by augmenting critical paths of the circuit design with error detection and error correction capabilities, instead of performing design optimizations on these critical paths to enable them to operate within design margins. This approach becomes attractive when the critical paths can be ordered not only by the actual slack value but also by the probability of becoming critical. For example, a long path for which significant delay is introduced by signal noise can be augmented with error detection and error correction capabilities instead of performing aggressor alignment to minimize the noise levels introduced by the aggressors. It is possible that all chips may be allowed to enter error detection/correction cycles as a normal mode of operation when augmented with error detection and correction capabilities.
3. An augmented circuit can be combined with a variable power supply, frequency, and body bias to maximize the performance of the underlying circuit design. In some variations to these embodiments, the augmentation system can augment a circuit design by creating islands in the circuit design that can be adjusted independently to minimize the power consumption of the manufactured circuit. This extension is possible because the error positions can be predetermined, and adjustments for various performance parameters can be pre-programmed into the augmented circuit. In further variations, this design approach can be used to counter aging of the augmented circuit.

4. For companies that can afford multiple product spins, the augmentation system can augment a circuit design to minimize risk for the initial product spins, and can be removed in later spins after the performance has been validated or the circuit design has been optimized.

In some embodiments of the present invention, the augmentation system can exist as a number of EDA tool capabilities that augment a given circuit design. In some variations to these embodiments, a first tool capability allows a circuit optimization procedure to insert DDSRs into a circuit design instead of having to up-size or having to re-time the circuit design. From a power/performance perspective, a manufactured circuit should work at a minimal error rate. However, a circuit design that incorporates too many DDSRs and relies on their error correction capability has a high likelihood of experiencing too many errors to achieve an optimal power or performance rating. Furthermore, augmenting a circuit design with DDSRs increases the manufacturing and runtime costs of the circuit, given that a DDSR has a larger size and power consumption in comparison to standard registers, given that some circuit implementations will also require minimum delay buffers, and given that the augmented circuit will require extra logic. Therefore, selecting an optimal set of registers to implement using DDSRs requires a static timing analysis tool that is capable of prioritizing circuit paths in terms of their probability of becoming critical.

This first tool capability is concerned with the yield of a given circuit design (i.e., percentage of manufactured chips that could be affected by a given critical path), the effects associated with logic probabilities (i.e., how often the most significant bit (MSB) switches when multiplying two numbers), and aggressor alignment probabilities (i.e., a given path can be determined to have a low weight if it becomes critical only when 5 or more aggressors align). In some variations to these embodiments, this tool capability is not required to produce accurate path priority to promote an efficient tool runtime, while in other embodiments, this tool is configured to produce an accurate path priority to guarantee optimal performance of the error detection and correction capabilities.

In some embodiments of the present invention, a second tool capability automatically partitions a circuit design into independently clocked blocks in a manner that abides by the aforementioned timing constraints C1-C7. In some variations of these embodiments, this second tool capability utilizes the module boundaries of a hierarchical circuit design as guidance when partitioning the circuit design.

In some embodiments of the present invention, the block level independently gated clocks and the timing constraints of an augmented circuit place further constraints onto the clock tree synthesis tool and onto the place-and-route tool. It is important that these two tools minimize the clock propagation delays within a given block, and optimize cell placement to minimize block area.

FIG. 7 presents a flow chart illustrating a process performed by a computer system for augmenting a circuit to detect and correct timing errors in accordance with an embodiment of the present invention. The system begins by partitioning the circuit into a set of blocks (operation 702). Next, the system integrates an error signal propagation circuit into the augmented circuit to couple error signals from the set of blocks (operation 704). Then, for a respective circuit block (operation 706), the system determines a set of registers to be implemented as DDSRs (operation 708) and replaces the set of registers with DDSRs (operation 710). The system also integrates a two-phase error correction circuit into the respective circuit block (operation 712), and integrates a timing circuit into the respective circuit block (operation 714). Note that operations 708-714 can be performed simultaneously or in any order.

FIG. 8 presents a flow chart illustrating a process performed by a computer system for configuring a circuit block of an augmented circuit to detect and correct timing errors in accordance with an embodiment of the present invention. The system performs a number of operations 802-812, either simultaneously or in any order. In one operation, the system configures a number of internal registers of the circuit block to stall during a first or a second stall phase (operation 802). In a second operation, the system configures an input buffer of the circuit block to sample and hold signal values during the first stall phase (operation 804). In a third operation, the system configures an input multiplexer to select the output of the input buffer during the second stall phase (operation 806). In a fourth operation, the system configures the input multiplexer to select the input signal source when the circuit block is not in the second stall phase (operation 808). In a fifth operation, the system configures a first output register to stall during the second stall phase (operation 810). In a sixth operation, the system configures a second output register to stall during the first or the second stall phase (operation 812).

FIG. 9 presents a flow chart illustrating a process performed by an augmented circuit for detecting and correcting timing errors in accordance with an embodiment of the present invention. The augmented circuit first determines whether a DDSR of a first circuit block detects an error (operation 902). If no error is detected, the augmented circuit triggers the input multiplexer in the first circuit block to select the input signal source for the circuit block (operation 904). Otherwise if an error is detected, the augmented circuit initiates a first stall phase during the clock cycle that follows error detection. During this first stall phase, the augmented circuit stalls all registers in the first circuit block except for the first output registers, and triggers the input buffer in the first circuit block to latch input signal values (operation 906). Then, the augmented circuit initiates a second stall phase during the clock cycle that follows the first stall phase. During this second stall phase, the augmented circuit stalls all registers in all circuit blocks except for the first circuit block, stalls the first and second output registers in the first circuit block, and triggers the input multiplexer of the first circuit block to select output signals of the input buffer (operation 908).

Computer System

FIG. 10 illustrates an exemplary computer system that facilitates augmenting a circuit to detect and correct timing errors in accordance with an embodiment of the present invention.

Computer system 1002 includes a processor 1004, a memory 1006, and a storage device 1008. Furthermore, computer system 1002 can be coupled to a display device 1010 and an input device 1011.

Storage device 1008 stores an operating system 1012, a circuit augmentation system 1014, a circuit design 1018, a number of coverage goals 1020, a number of project configurations 1022, and an augmented circuit 1024. In one embodiment, IC augmentation system 1014 includes a graphical user interface (GUI) module 1016.

During operation, IC augmentation system 1014 is loaded from storage device 1008 into memory 1006 and executed by processor 1004. Circuit augmentation system 1014 takes a circuit design 1018 as input, along with a number of coverage goals 1020 and a number of project configurations 1022, and generates an augmented circuit 1024 that includes capabilities for detecting and correcting timing errors.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for augmenting a circuit to detect and correct timing errors, the method comprising:
    partitioning the circuit into a set of blocks, wherein a respective block is clocked by a local clock signal;
    integrating an error signal propagation circuit between the set of blocks; and
    for a respective block:
        determining a set of internal registers that are to be implemented as double data sampling registers, wherein a given double data sampling register is configured to generate an error signal when it detects a timing error;
        replacing the determined set of internal registers with double data sampling registers;
        integrating a two-phase error correction circuit into the respective block, wherein when notified of a timing error by a double data sampling register, the two-phase error correction circuit is configured to stall registers in the respective block; and
        integrating into the respective block a timing circuit that generates the local clock signal from a global clock signal and the error signals.

2. The method of claim 1, wherein integrating the two-phase error correction circuit into the respective block comprises:
    configuring internal registers of the respective block to stall during a first or a second stall phase of the two-phase error correction circuit;
    configuring an input buffer to sample and hold signal values of an input signal source for the respective block during the first stall phase;
    configuring an input multiplexer to select output signals of the input buffer during the second stall phase, and to otherwise select the input signal source for the respective block, wherein outputs of the input multiplexer are coupled to primary input signals of the respective block;
    configuring a first output register to stall during the second stall phase of the two-phase error correction circuit, wherein output signals of the first output register are coupled to primary output signals of the respective block; and
    configuring a second output register to stall during the first or second stall phase of the two-phase error correction circuit, wherein output signals of the second output register are coupled to input signals of the first output register.

3. The method of claim 2, wherein the two-phase error correction circuit activates the first stall phase for a clock cycle following a notification of a timing error by a double data sampling register.

4. The method of claim 3, wherein the two-phase error correction circuit activates the second stall phase for a clock cycle following the first stall phase.

5. The method of claim 1, wherein determining a set of registers that are to be implemented as double data sampling registers comprises:
    selecting an error-detection coverage which specifies a percentage of registers in a respective block that are to be implemented as double data sampling registers;
    determining critical paths in the respective block that are difficult to design at a required frequency; and
    selecting a number of registers from the determined critical paths so that the percentage of registers that are selected falls within the selected error-detection coverage.

6. The method of claim 1, wherein integrating an error signal propagation circuit between the set of blocks comprises:
    generating a block level error signal for a respective block by combining the error signals generated by the double-data sampling registers of the respective block using a first logic circuit, wherein the first logic circuit propagates an error value onto the block level error signal when the signal value for at least one of the error signals generated by the double-data sampling registers is an error value; and
    generating a global error signal by combining the block level error signals from the set of blocks using a second logic circuit, wherein the second logic circuit propagates an error value onto the global error signal when the signal value for at least one of the block level error signals is an error value.

7. The method of claim 6, wherein the timing circuit of the respective block generates the local clock signal based on the block level error signal, the global error signal, and the global clock signal;
    wherein the timing circuit propagates the global clock signal onto the local clock signal when the signal values for the block level error signal and the global error signal are not error values; and
    wherein the timing circuit blocks a clock signal transition of the global clock signal from propagating onto the local clock signal when the signal value for at least one of the block level error signal or the global error signal is an error value.

8. A non-transitory computer-readable storage medium storing instructions that when executed by a computer cause the computer to perform a method for augmenting a circuit to detect and correct timing errors, the method comprising:
    partitioning the circuit into a set of blocks, wherein a respective block is clocked by a local clock signal;
    integrating an error signal propagation circuit between the set of blocks; and
    for a respective block:
        determining a set of internal registers that are to be implemented as double data sampling registers, wherein a given double data sampling register is configured to generate an error signal when it detects a timing error;

replacing the determined set of internal registers with double data sampling registers;

integrating a two-phase error correction circuit into the respective block, wherein when notified of a timing error by a double data sampling register, the two-phase error correction circuit is configured to stall registers in the respective block; and integrating into the respective block a timing circuit that generates the local clock signal from a global clock signal and the error signals.

9. The computer-readable storage medium of claim 8, wherein integrating the two-phase error correction circuit into the respective block comprises:

configuring internal registers of the respective block to stall during a first or a second stall phase of the two-phase error correction circuit;

configuring an input buffer to sample and hold signal values of an input signal source for the respective block during the first stall phase;

configuring an input multiplexer to select output signals of the input buffer during the second stall phase, and to otherwise select the input signal source for the respective block, wherein outputs of the input multiplexer are coupled to primary input signals of the respective block;

configuring a first output register to stall during the second stall phase of the two-phase error correction circuit, wherein output signals of the first output register are coupled to primary output signals of the respective block; and configuring a second output register to stall during the first or second stall phase of the two-phase error correction circuit, wherein output signals of the second output register are coupled to input signals of the first output register.

10. The computer-readable storage medium of claim 9, wherein the two-phase error correction circuit activates the first stall phase for a clock cycle following a notification of a timing error by a double data sampling register.

11. The computer-readable storage medium of claim 10, wherein the two-phase error correction circuit activates the second stall phase for a clock cycle following the first stall phase.

12. The computer-readable storage medium of claim 8, wherein determining a set of registers that are to be implemented as double data sampling registers comprises:

selecting an error-detection coverage which specifies a percentage of registers in a respective block that are to be implemented as double data sampling registers;

determining critical paths in the respective block that are difficult to design at a required frequency; and selecting a number of registers from the determined critical paths so that the percentage of registers that are selected falls within the selected error-detection coverage.

13. The computer-readable storage medium of claim 8, wherein integrating an error signal propagation circuit between the set of blocks comprises:

generating a block level error signal for a respective block by combining the error signals generated by the double-data sampling registers of the respective block using a first logic circuit, wherein the first logic circuit propagates an error value onto the block level error signal when the signal value for at least one of the error signals generated by the double-data sampling registers is an error value; and generating a global error signal by combining the block level error signals from the set of blocks using a second logic circuit, wherein the second logic circuit propagates an error value onto the global error signal when the signal value for at least one of the block level error signals is an error value.

14. The computer-readable storage medium of claim 13, wherein the timing circuit of the respective block generates the local clock signal based on the block level error signal, the global error signal, and the global clock signal;

wherein the timing circuit propagates the global clock signal onto the local clock signal when the signal values for the block level error signal and the global error signal are not error values; and wherein the timing circuit blocks a clock signal transition of the global clock signal from propagating onto the local clock signal when the signal value for at least one of the block level error signal or the global error signal is an error value.

15. An apparatus for detecting and correcting timing errors in a circuit, comprising:

an error signal propagation circuit configured to generate a global error signal; and a set of blocks partitioned from the circuit, wherein a respective block is clocked by a local clock signal, and wherein the respective block comprises:

a set of internal registers that are implemented as double data sampling registers, wherein a given double data sampling register is configured to generate an error signal when it detects a timing error;

a two-phase error correction circuit, wherein when notified of a timing error by a double data sampling register, the two-phase error correction circuit is configured to stall registers in the respective block; and a timing circuit that generates the local clock signal from a global clock signal and the error signals.

16. The apparatus of claim 15, wherein the two-phase error correction circuit is configured to:

stall internal registers of the respective block during a first or a second stall phase of the two-phase error correction circuit;

trigger an input buffer to sample and hold signal values of an input signal source for the respective block during the first stall phase;

trigger an input multiplexer to select output signals of the input buffer during the second stall phase, and to otherwise select the input signal source for the respective block, wherein outputs of the input multiplexer are coupled to primary input signals of the respective block;

stall a first output register during the second stall phase of the two-phase error correction circuit, wherein output signals of the first output register are coupled to primary output signals of the respective block; and stall a second output register during the first or second stall phase of the two-phase error correction circuit, wherein output signals of the second output register are coupled to input signals of the first output register.

17. The apparatus of claim 16, wherein the two-phase error correction circuit activates the first stall phase for a clock cycle following a notification of a timing error by a double data sampling register.

18. The apparatus of claim 17, wherein the two-phase error correction circuit activates the second stall phase for a clock cycle following the first stall phase.

19. The apparatus of claim 15, wherein the error signal propagation circuit comprises:

a first circuit configured to generate a block level error signal for a respective block, wherein the input signals of the first circuit are coupled to the error signals generated by the double-data sampling registers of the respective block; and a second circuit configured to generate a global error signal, wherein the input signals of the second circuit are coupled to the block level error signals from the set of blocks.

20. The apparatus of claim 19, wherein the timing circuit of the respective block comprises a third circuit configured to generate the local clock signal, wherein the input signals of the third circuit are coupled to the block level error signal, the global error signal, and the global clock signal.

* * * * *